US007016038B2

(12) United States Patent
Chrisp et al.

(10) Patent No.: US 7,016,038 B2
(45) Date of Patent: Mar. 21, 2006

(54) COMPACT IMAGING SPECTROMETER UTILIZING IMMERSED GRATINGS

(75) Inventors: Michael P. Chrisp, Danville, CA (US); Scott A. Lerner, Corvallis, OR (US); Paul J. Kuzmenko, Livermore, CA (US); Charles L. Bennett, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/066,370

(22) Filed: Feb. 25, 2005

(65) Prior Publication Data

US 2006/0038995 A1 Feb. 23, 2006

Related U.S. Application Data

(63) Continuation-in-part of application No. 10/920,880, filed on Aug. 17, 2004.

(51) Int. Cl.
*G01J 3/28* (2006.01)

(52) U.S. Cl. ....................................... 356/328

(58) Field of Classification Search ................ 356/305, 356/326, 328, 334
See application file for complete search history.

(56) References Cited

U.S. PATENT DOCUMENTS

| 5,127,728 | A | 7/1992 | Warren et al. |
|---|---|---|---|
| 5,717,487 | A | 2/1998 | Davies |
| 5,781,290 | A | 7/1998 | Bittner et al. |
| 5,880,834 | A | 3/1999 | Chrisp |
| 6,016,220 | A | 1/2000 | Cook |
| 6,078,048 | A | 6/2000 | Stevens et al. |
| 6,100,974 | A | 8/2000 | Reininger |
| 6,122,051 | A | 9/2000 | Ansley et al. |
| 6,266,140 | B1 | 7/2001 | Xiang et al. |
| 6,388,799 | B1 | 5/2002 | Arnone et al. |
| 6,538,737 | B1 | 3/2003 | Sandstrom et al. |
| 2002/0101587 | A1 | 8/2002 | Wilson et al. |
| 2002/0135770 | A1 | 9/2002 | Lewis et al. |
| 2003/0016355 | A1 | 1/2003 | Koike et al. |

FOREIGN PATENT DOCUMENTS

WO  WO 99/63311  12/1999

*Primary Examiner*—F. L. Evans
(74) *Attorney, Agent, or Firm*—Eddie E. Scott; Alan H. Thompson

(57) ABSTRACT

A compact imaging spectrometer with an immersive diffraction grating that compensates optical distortions. The imaging spectrometer comprises an entrance slit for transmitting light, a system for receiving the light and directing the light, an immersion grating, and a detector array. The entrance slit, the system for receiving the light, the immersion grating, and the detector array are positioned wherein the entrance slit transmits light to the system for receiving the light and the system for receiving the light directs the light to the immersion grating and the immersion grating receives the light and directs the light through an optical element to the detector array.

8 Claims, 2 Drawing Sheets

COMPACT IMAGING SPECTROMETER UTILIZING IMMERSED GRATINGS

CROSS-REFERENCE TO RELATED APPLICATIONS

This application is a Continuation-in-Part of U.S. patent application Ser. No. 10/920,880 filed Aug. 17, 2004 and titled, "Compact Imaging Spectrometer Utilizing Immersed Gratings." U.S. patent application Ser. No. 10/920,880 filed Aug. 17, 2004, titled "Compact Imaging Spectrometer Utilizing Immersed Gratings," is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to a spectrometer and more particularly to a compact imaging spectrometer.

2. State of Technology

U.S. Pat. No. 5,717,487 provides the following state of technology information: "A spectrometer is a known instrument for examining the spectral characteristics of light. Light emitted from or reflected by an object is received within the spectrometer and separated into its spectral components, such as the red, green and blue colored spectra as occurs in equal intensity when standard white light is so analyzed. The intensity of each such spectral component of that received light may be readily observed and measured. Each element of nature, molecular components, organic and inorganic compounds, living plants, man, animal and other substances is known to emit a unique spectrum that may be used as an indicium to identify the emitter."

United States Patent Application No. 20020135770 published Sep. 26, 2003 provides the following state of technology information: "Imaging spectrometers have been applied to a variety of disciplines, such as the detection of defects in industrial processes, satellite imaging, and laboratory research. These instruments detect radiation from a sample and process the resulting signal to obtain and present an image of the sample that includes spectral and chemical information about the sample."

U.S. Pat. No. 6,078,048 provides the following state of technology information: "In recent years substantial effort has been directed to the problem of detection of airborne chemicals. The remote detection of airborne chemicals issuing from exhaust stacks, vehicle exhaust, and various exhaust flumes or plumes, offers a non-intrusive means for detecting, monitoring, and attributing pollution source terms. To detect, identify, and quantify a chemical effluent, it is highly desirable to operate at the limiting spectral resolution set by atmospheric pressure broadening at approximately 0.1 $cm^{-1}$. This provides for maximum sensitivity to simple molecules with the narrowest spectral features, allows for corrections for the presence of atmospheric constituents, maximizing species selectivity, and provides greater opportunity to detect unanticipated species."

U.S. Pat. No. 5,880,834 provides the following state of technology information: "There are three problems in designing an imaging spectrometer where light in a slice of an image field passing through an entrance slit is to be diffracted by a grating parallel to the slit and imaged onto a focal plane for display or recording with good spatial resolution parallel to the slit and good spectral resolution perpendicular to the slit: 1. Eliminating astigmatism over the spectrum on the image plane. 2. Removing field curvature from the spectrum focused onto the image plane. 3. Obtaining good spatial resolution of the entrance slit which involves eliminating astigmatism at different field angles from points on the entrance slit."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a compact imaging spectrometer with an immersive or reflective diffraction grating that compensates optical distortions. The imaging spectrometer comprises an entrance slit for transmitting light, a system for receiving the light and directing the light, an immersion grating, and a detector array. The entrance slit, the system for receiving the light, the immersion grating, and the detector array are positioned wherein the entrance slit transmits light to the system for receiving the light and the system for receiving the light directs the light to the immersion grating and the immersion grating receives the light and directs the light through an optical element to the detector array.

The compact imaging spectrometer uses smaller cryogenic coolers facilitating its using in portable (man carried) gas detection systems and in small unmanned aerial vehicles for remote gas detection. These instruments have application for Homeland Defense to check for the presence of biological or chemical weapons without entering the contaminated areas. These instruments can be used for pollution detection, and remote sensing of agricultural crops, and geological identification. They can also be used for the remote monitoring of industrial processes.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
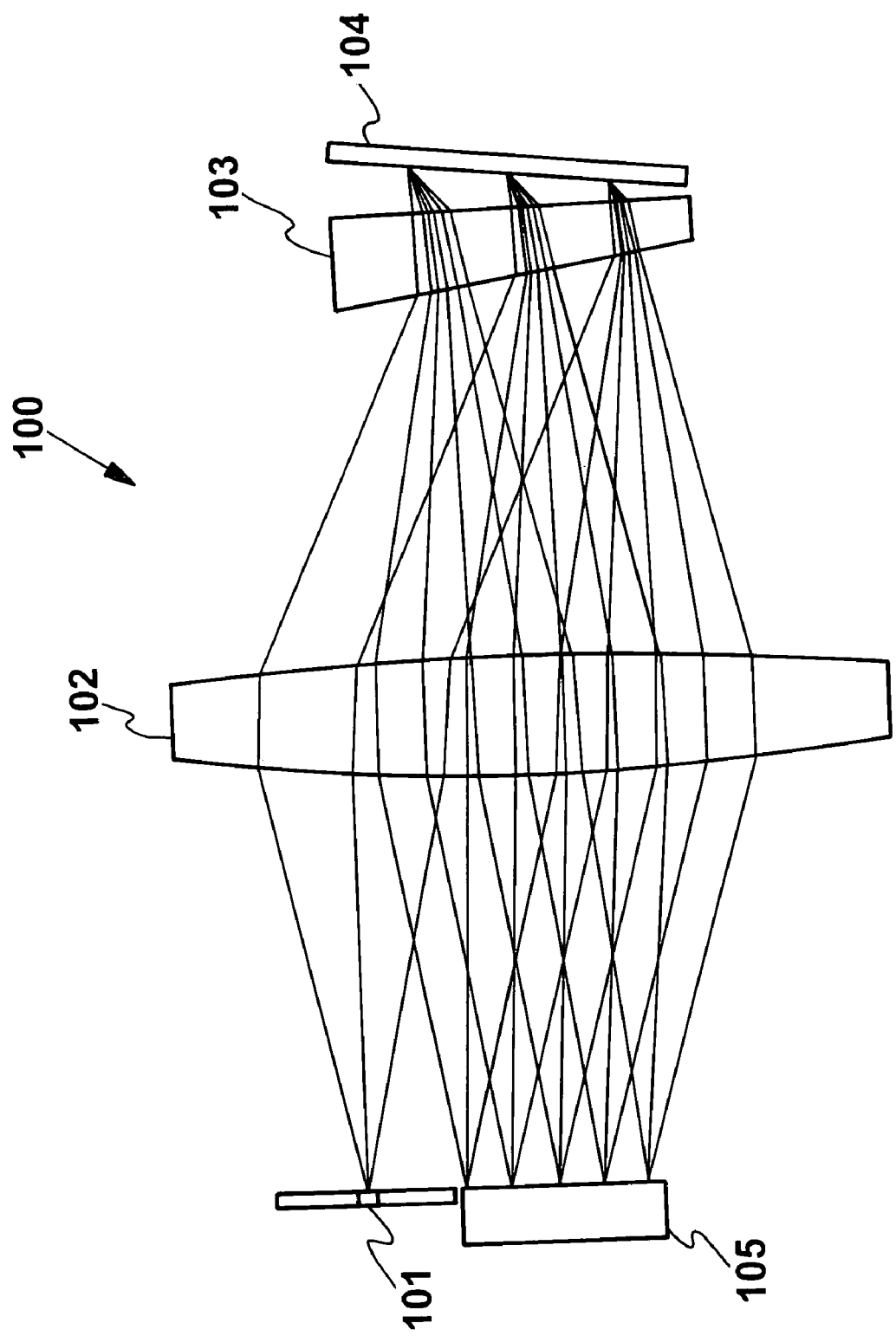
FIG. 1 illustrates an embodiment of a compact imaging spectrometer constructed in accordance with the present invention utilizing a reflective grating with a prism to provide the distortion correction.

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to FIG. 1 of the drawings, an embodiment of a compact imaging spectrometer constructed in accordance with the present invention is illustrated. This embodiment of the present invention is designated generally by the reference numeral 100. FIG. 1 is a raytrace of the imaging spectrometer 100. The structural elements of the compact imaging spectrometer 100 include an entrance slit 101, a dioptric lens 102, a prism 103, a reflective grating 104, and a detector 105.

The light passes from the entrance slit 101 to the dioptric lens 102 which collimates the light and sends it through the prism 103 to the reflective grating 104. The grating 104 disperses the light and sends it back through the prism 103 and on to the dioptric lens 102. The light is focused by the dioptric lens 102 to the detector 105. The advantage of this design is that a conventional reflective grating 104 can be used, with the prism 103 providing the distortion correction. The grating can be generated by a ruling engine, replication, holographically, or by e-beam lithography. The prism 103 is tilted with respect to the grating to ensure that the ghost reflections from the additional optical surfaces do not fall on the detector. The imaging spectrometer 100 has been designed to the requirements in Table 1 and is diffraction limited over the wavelength range with excellent spatial and spectral resolutions.

TABLE 1

| | |
|---|---|
| Spectral Range | 7.5–13.5 microns |
| F-number (round or square) | 4 |
| Detector array | 256 spatial × 256 spectral |
| Pixel Size | 40 microns |
| Entrance Slit Length | 10.24 mm |
| Spatial Distortion: Change in Spatial Mapping with Wavelength | <0.1 pixel (<±2 microns) |
| Spectral Distortion: Spectral Smile | <0.1 pixel (<±2 microns) |
| Optical Performance | Diffraction Limited |
| Ghosting | <0.1% of the primary image |

The spectral slit curvature has been corrected to less than one tenth of a pixel over the detector arrays. This is the curvature of slit image on the detector 105 at a single wavelength, which is a common problem with imaging spectrometer designs. The spatial mapping distortion has also been corrected to less than one tenth of a pixel over the full wavelength range. This means that the spectrum from a single point in the entrance slit will not wander from the center of a row of pixels by less than ±2 microns. Correcting the spectral slit curvature and the spatial mapping distortion with wavelength to less than one tenth of a pixel ensures that the images do not have to be resampled to correct for these effects.

The imaging spectrometer 100 has use for Homeland Defense to check for the presence of biological or chemical weapons without entering the contaminated areas. The imaging spectrometer 100 also has use for commercial remote sensing where portability is important. The imaging spectrometer 100 can be used for pollution detection, and remote sensing of agricultural crops, and geological identification among the various potential applications. The imaging spectrometer 100 can be used for the remote monitoring of industrial processes.

Small size for an imaging spectrometer is extremely important because it determines the requirements for the cryogenic cooling. For example, if the spectrometer is small it can fly in a small UAV. Also, if the spectrometer is small it is person portable. The imaging spectrometer 100 has a size envelope that is smaller than spectrometers currently in use. The entrance slit 101, dioptric lens 102, prism 103, reflective grating 104, and detector 105 fit within the envelope. The X axis and the Y axis are shown in the plane of the paper. The Z axis extends perpendicular to both the X axis and the Y axis. The envelope is 3.2 cm by 2.0 cm by 1.5 cm or smaller. As shown in FIG. 1, the X axis is 3.2 cm, the Y axis is 2.0 cm, and the Z axis is 1.5 cm. The compact imaging spectrometer 100 has a front and a back. The entrance slit 101 is located at or near the font and the grating 103 is located at or near the back.

Figure 2:
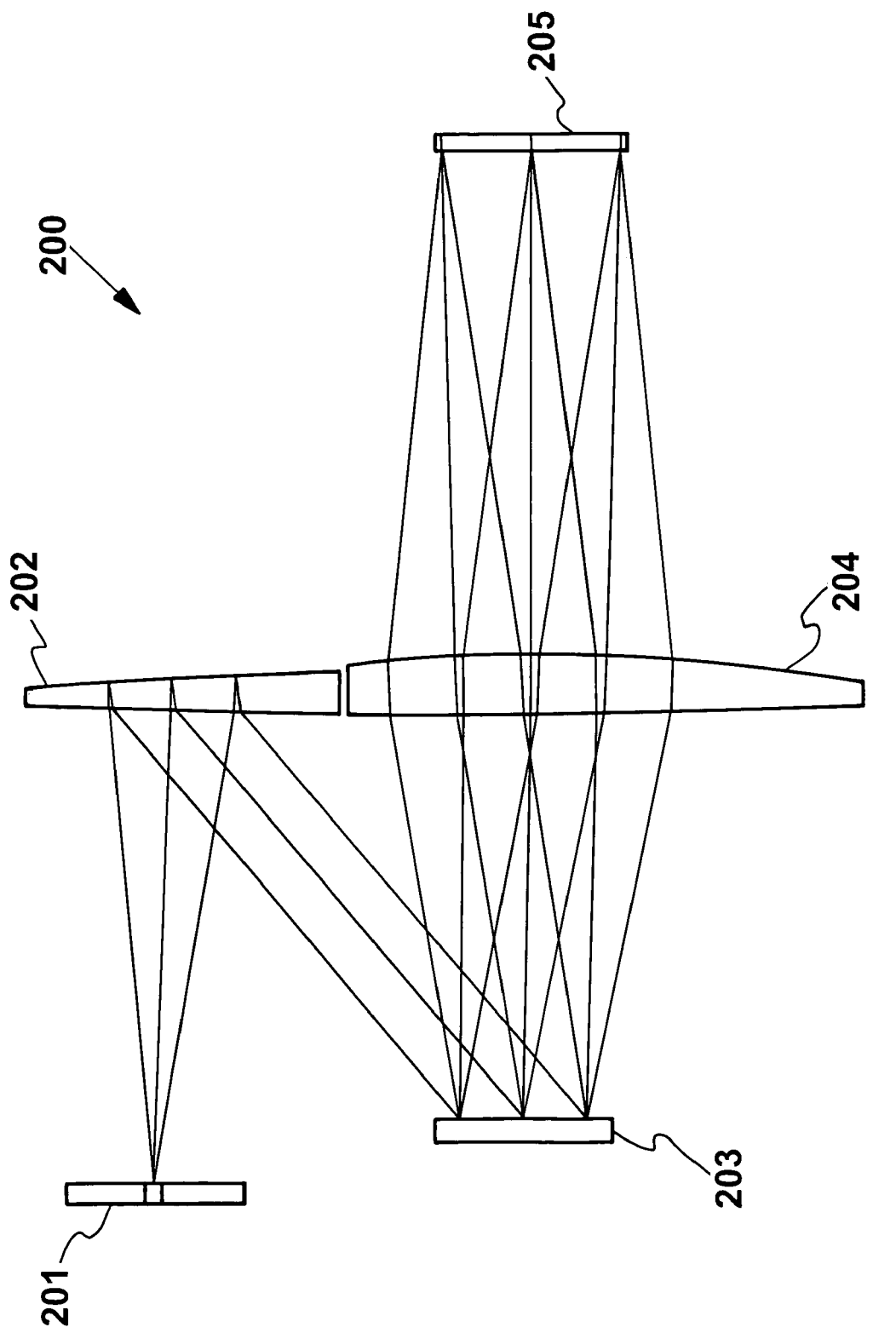
FIG. 2 illustrates another embodiment of a compact imaging spectrometer constructed in accordance with the present invention. In this design a reflective grating is utilized in conjunction with a catadioptric lens. The optical surfaces of the catadioptric lens have been tilted and decentered to provide the distortion correction.

Referring now to FIG. 1 of the drawings, an embodiment of a compact imaging spectrometer constructed in accordance with the present invention is illustrated. This embodiment of the present invention is designated generally by the reference numeral 200. FIG. 2 is a raytrace of the imaging spectrometer 200. The structural elements of the compact imaging spectrometer 200 include an entrance slit 201, a catadioptric lens 204, a reflective grating 203, and a detector 205.

The light passes from the entrance slit 201 to the catadioptric lens 204. The light passes through the catadioptric lens 204 and is reflected back through the lens by the immersed mirror surface 202. The light from the catadioptric lens is received by the reflective grating 103. The reflective grating 203 disperses the light and sends it back through the catadioptric lens 204, which focuses the light onto the detector 205.

The advantage of this design is that a conventional reflective grating 203 can be used, with the catadioptric lens 204 providing distortion correction from its tilted and decentered surfaces. The lens 204 can be generated by diamond turning, in the current design the full aperture surface is a rotational asphere, the immersed mirror surface is spherical and tilted, and the final surface is a tilted and decentered rotational asphere. The grating 203 can be generated by a ruling engine, replication, holographically, or by e-beam lithography. The imaging spectrometer 200 has been designed to the requirements in Table 1 and is diffraction limited over the wavelength range with excellent spatial and spectral resolutions.

The spectral slit curvature has been corrected to less than one tenth of a pixel over the detector arrays. This is the curvature of slit image on the detector 105 at a single wavelength, which is a common problem with imaging spectrometer designs. The spatial mapping distortion has also been corrected to less than one tenth of a pixel over the full wavelength range. This means that the spectrum from a single point in the entrance slit will not wander from the center of a row of pixels by less than ±2 microns. Correcting the spectral slit curvature and the spatial mapping distortion with wavelength to less than one tenth of a pixel ensures that the images do not have to be resampled to correct for these effects.

Small size for an imaging spectrometer is extremely important because it determines the requirements for the cryogenic cooling. For example, if the spectrometer is small it can fly in a small UAV. Also, if the spectrometer is small it is person portable. The imaging spectrometer 200 has a size envelope that is smaller than spectrometers currently in use. The entrance slit 201, catadioptric lens 204, reflective grating 203, and detector 204 fit within the envelope. The X axis and the Y axis are shown in the plane of the paper. The Z axis extends perpendicular to both the X axis and the Y axis. The envelope is 6.1 cm by 5.0 cm by 2.5 cm or smaller. As shown in FIG. 1, the X axis is 5.0 cm, the Y axis is 6.1 cm, and the Z axis is 2.5 cm.

The imaging spectrometer of the present invention has many uses. Examples of its use include use in Homeland Defense to check for the presence of biological or chemical weapons without entering the contaminated areas. The imaging spectrometer also has use for commercial remote sensing where portability is important. The imaging spectrometer can be used for pollution detection and remote sensing of agricultural crops. It can be used for geological identification and for the remote monitoring of industrial processes. These are examples of the various potential applications of the imaging spectrometer of the present invention.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A compact imaging spectrometer apparatus, comprising:
    an entrance slit for transmitting light,
    a dioptric lens,
    a prism,
    a reflective grating, and
    a detector array,
    said entrance slit, said dioptric lens, said prism, said reflective grating, and said a detector array positioned wherein
    said entrance slit transmits light to said to said dioptric lens and
    said dioptric lens directs said light to said prism and
    said prism receives the light and directs to said reflective grating,
    said reflective grating directs said light to said dioptric lens, prism, and detector array.

2. The compact imaging spectrometer apparatus of claim 1 wherein said reflective grating is fabricated by conventional ruling, by holographic means, or by e-beam lithography.

3. A compact imaging spectrometer apparatus, comprising:
    an entrance slit for transmitting light,
    a catadioptric lens for directing light,
    an immersed mirror surface on said catadioptric lens,
    a rotational asphere on said catadioptric lens,
    a reflective grating for directing light, and
    a detector array,
    said entrance slit, said catadioptric lens, said immersed mirror surface, said reflective grating, said rotational asphere, and said detector array are positioned wherein
    said entrance slit transmits light to said catadioptric lens, the said light is transmitted through said rotational asphere to said immersed mirror surface, said immersed mirror surface reflects the said light out through said rotational aspheric to said reflective grating, said reflective grating directs and disperses the said light back to said catadioptric lens and the said light enters said catadioptric lens through said rotational aspheric and exits said catadioptric lens, and said catadioptric lens focuses and directs the said light to said detector array.

4. The compact imaging spectrometer apparatus of claim 3 wherein the said immersed mirror surface of the said catadioptric lens is tilted.

5. The compact imaging spectrometer apparatus of claim 3 wherein said rotational asphere of said catadioptric lens is tilted and decentered.

6. The compact imaging spectrometer apparatus of claim 3 wherein said surfaces of the said catadioptric lens have their forms changed to spherical, conic or general aspheric surfaces to improve the imaging properties.

7. The compact imaging spectrometer apparatus of claim 3 wherein said surfaces of the said catadioptric lens are tilted and decentered to correct the spectral and spatial distortion and to improve the imaging properties.

8. The compact imaging spectrometer apparatus of claim 3 wherein said reflective grating is ruled on a rotational aspheric surface or generalized aspheric surface.

* * * * *